Sept. 24, 1957  A. H. SENGLAUB ET AL  2,807,682
SAFETY CUTOUT SWITCH FOR TRACTORS
Filed Nov. 18, 1954  2 Sheets-Sheet 1

INVENTORS
ARTHUR H. SENGLAUB
CHESTER A. GIRARDI
BY
Young Wright
ATTORNEYS

Sept. 24, 1957  A. H. SENGLAUB ET AL  2,807,682
SAFETY CUTOUT SWITCH FOR TRACTORS Filed Nov. 18, 1954  2 Sheets-Sheet 2

INVENTORS
ARTHUR H. SENGLAUB
CHESTER A. GIRARDI
BY
Young Wright
ATTORNEYS

United States Patent Office 2,807,682
Patented Sept. 24, 1957

2,807,682

SAFETY CUTOUT SWITCH FOR TRACTORS

Arthur H. Senglaub and Chester A. Girardi, Manitowoc, Wis., assignors to Newton Mowers, Inc., Manitowoc, Wis., a corporation Application November 18, 1954, Serial No. 469,634

4 Claims. (Cl. 200—61.47)

This invention appertains broadly to the ignition systems of automotive vehicles and more particularly to a novel device for automatically interrupting the ignition circuit of a vehicle, such as a farm tractor, when the vehicle tilts from any cause to an angle considered dangerous to the safe operation thereof.

One of the primary objects of the invention is to provide a safe and positive means of a simple character which can be easily and quickly installed on a tractor for breaking the ignition circuit and thus stop the forward motion of the tractor when the tractor tilts at a dangerous angle either backwards or sideways or combinations of these directions.

Another salient object of the invention is the provision of the use of a novel circular mercury switch incorporated in the circuit, whereby to bring about the quick breaking of the circuit when the switch is tilted in any direction beyond a certain operating condition.

A further object of the invention is to provide a circular mercury switch embodying two upright risers for the electrodes and an oppositely disposed single upright riser serving as means for the entrance of the mercury, means for exhausting air from the tube and the sealing of the tube, and also as a reservoir for the mercury when the switch is tilted.

A further important object of the invention is the provision of a novel case for receiving the circular mercury switch, whereby the switch will be effectively protected against jolts and the like during the operation of the tractor.

A still further object of the invention is the provision of a novel switch case and novel means for mounting the case on a desired part of the tractor, so that the case and its enclosed switch can be set absolutely level with the normal operation of the tractor and so that the case and switch can be quickly tilted by the operator of the tractor manually, when the tractor tilts at a dangerous angle so that the ignition circuit can be temporarily restored to normal and thus permit the operator to extricate himself from his dangerous position.

With these and other objects in view, the invention consists in the novel construction, arrangement and formation of parts, as will be hereinafter more specifically described and claimed, and illustrated in the accompanying drawings, in which drawings, Figure 1 is a side elevational view of a tractor showing the improved cutout switch incorporated therewith;

Referring to the drawings in detail, wherein similar reference characters designate corresponding parts throughout the several views, the letter C generally indicates the novel cutout switch for an automotive vehicle, such as a tractor T.

Figure 1:
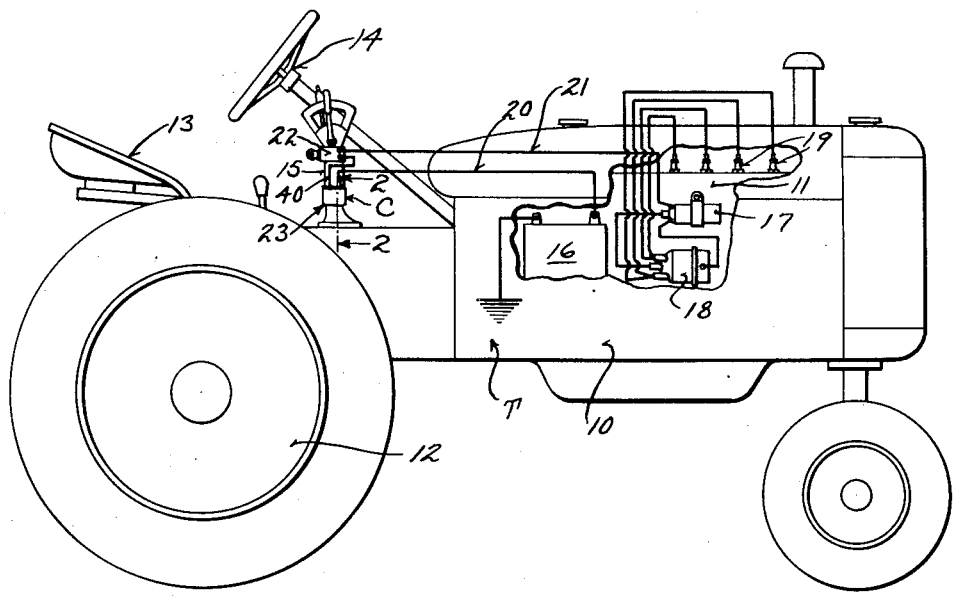

The tractor T has only been illustrated to show the use of the invention, and the tractor can be considered of any preferred make, now sold on the open market, and this tractor will not be described in detail. However, the same includes the usual frame 10 supporting the internal combustion engine 11 for driving the rear wheels 12. Also mounted on the frame is the driver's seat 13 and arranged in front of the seat are the steering wheel and post 14 and the transmission column 15. The tractor T includes the common type of ignition system embodying a source of electrical energy, such as a storage battery 16, ignition coil 17 and distributor 18 for the spark plugs 19. One terminal of the storage battery is grounded and the other terminal has connected thereto a lead wire 20 and a return wire 21 parallels the lead wire and is connected to a terminal of the ignition coil 17. The wires 20 and 21 usually lead to a key operated lock switch 22 fastened to any desired part of the tractor such as the instrument panel or as shown, on the transmission column 15.

In the present instance, we have shown the cutout switch mounted on the column 15, but it is to be understood that the switch can be placed at any desired point on the tractor, but preferably, within the reach and sight of the operator of the tractor and the switch, as illustrated, can be interposed in the lead wire 20.

The switch C comprises a case or housing 23 preferably formed from dielectric material, and this case includes a body 24 and a closure cap 25. The body 24 includes a bottom wall 26 and a cylindrical side wall 27. The edge of the cap 25 is rabbeted to receive the upper edge of the side wall 27, and has formed on its lower surface an axially disposed boss 28. The cap 25 can be detachably secured to the body 24 by means of a bolt 29 extended through the lower wall 26 and threaded into the boss 28.

Mounted within the case 23 is the novel mercury switch tube 30 and this tube forms an important feature of the invention. The mercury switch tube 30 includes an open substantially circular shaped body portion 31 and the ends of the tube are bent upwardly to form spaced parallel vertically extending risers 32 and 33 providing upright chamber therein. The risers or chambers 32 and 33 have sealed therein and carry respectively electrodes 34 and 35. These electrodes terminate slightly short of the lower wall of the circular body 31. The body 31 is partially filled with electric conducting material, such as mercury 36, and when the body is in a horizontal plane, the mercury covers the lower terminals of the electrodes so as to bridge these terminals and establish the ignition for the motor 11 when the key operated switch 22 is on. Obviously, when the body 31 is tilted at an angle to the horizontal the mercury will flow and separate away from the lower ends of the electrodes and thus interrupt the circuit. Directly opposite the risers 32 and 33 is a third upright riser 37 and this riser initially is utilized as a means for placing the mercury within the switch tube and for exhausting air from the tube. After the exhausting of the air from the tube, the riser is then sealed and this riser constitutes a reservoir for receiving mercury when the switch tube is tilted. By providing this riser, sufficient space is allowed to permit the quick flow of the mercury away from the electrodes.

The cap 25 of the case 23 carries terminal posts 38 and 39 and these posts are electrically connected to the electrodes 35 and 34. The terminal posts in turn have electrically connected therewith, respectively, the lead wire 20 and a branch wire 40 leading to one terminal of the switch lock 22 and the other terminal of the switch lock has electrically connected therewith the wire 21 which leads to the ignition coil. Formed within the case 23 is a vertical rib 41 and this rib constitutes a supporting and location member for the mercury switch tube. In placing the tube 30 within the case, the risers 32 and 33 lie on opposite sides of the rib and thus these risers are located exactly relative to the support for the case, which will be later described. A resilient shock absorbing packing or pad 42 is placed on the lower wall 26 of the case and the circular body part 31 of the tube rests on this packing. The tube is held firmly on this packing by a clamp plate 43 slidably mounted on the bolt 29. Bearing against the clamp plate 43 is an expansion spring 44 which is coiled about the bolt and the upper end of the spring encircles the boss 28 and bears against the cap 25. Hence, the tube is firmly held on the pad 42 in such a manner that the danger of breaking the tube is lessened.

Figure 2:
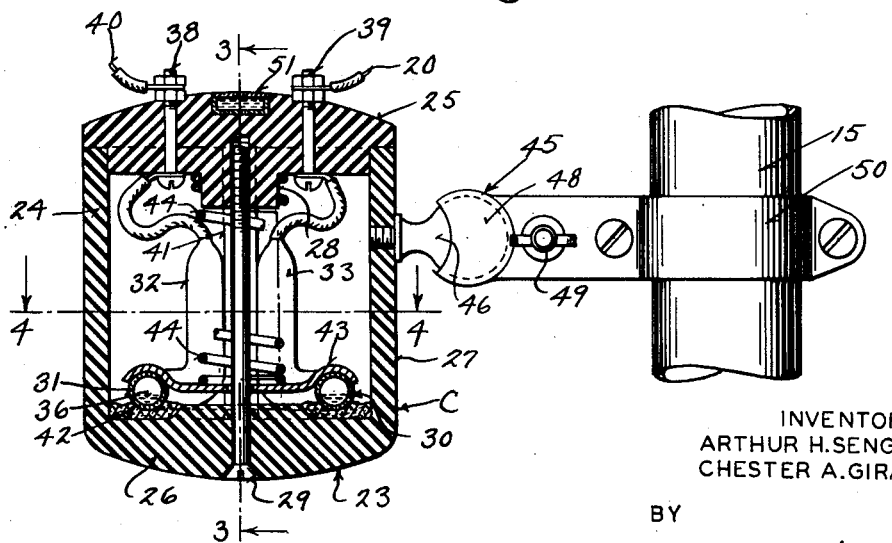
Figure 2 is an enlarged detail vertical sectional view through the cutout switch taken on the line 2—2 of Figure 1, looking in the direction of the arrows, the view also showing one preferred form of means for connecting the switch to a desired part of the tractor, the section also being indicated on the line 2—2 of Figure 7, looking in the direction of the arrows.
Figure 3:
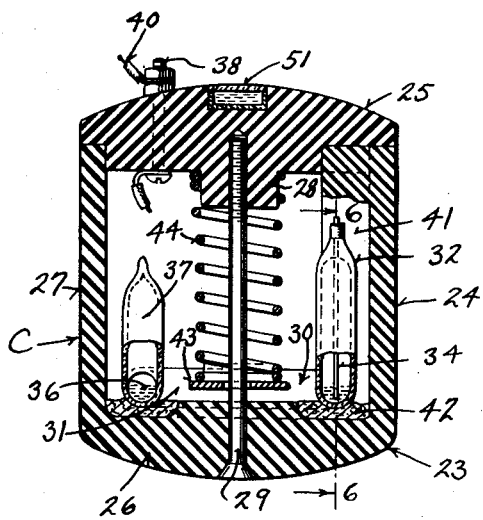
Figure 3 is a vertical sectional view through the switch taken at right angles to Figure 2, and on the line 3—3 of Figure 2, looking in the direction of the arrows.
Figure 4:
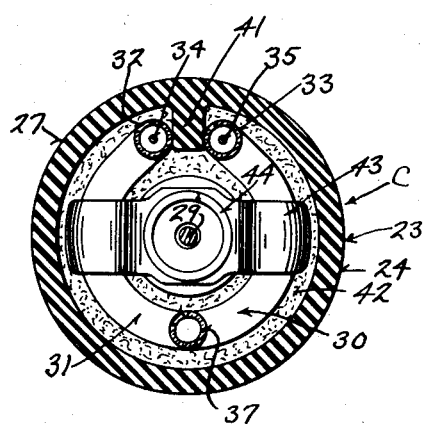
Figure 4 is a horizontal sectional view through the switch taken on the line 4—4 of Figure 2, looking in the direction of the arrows, the view illustrating the novel arrangement of the risers.
Figure 5:
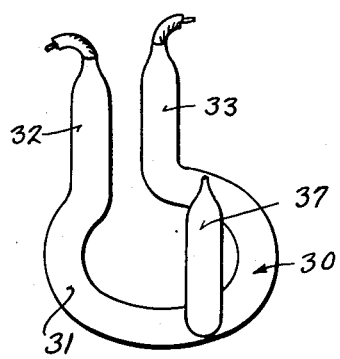
Figure 5 is a detail perspective view of the mercury switch tube.
Figure 7:
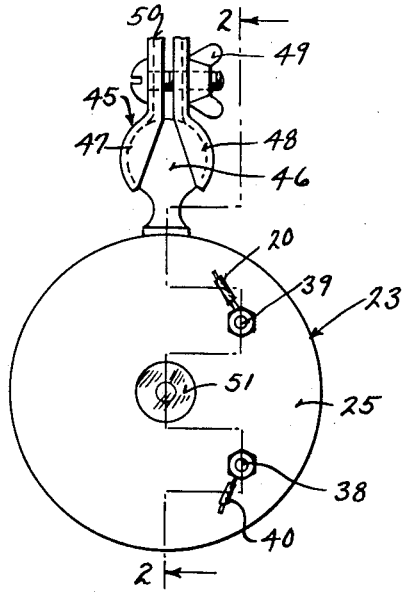
Figure 7 is a top plan view of the complete switch.
Figure 6:
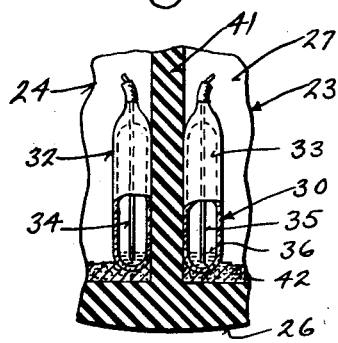
Figure 6 is a detail fragmentary vertical sectional view through the switch taken on the line 6—6 of Figure 3, looking in the direction of the arrows.

One of the important features of the invention is the provision of means for supporting the case on a desired part of the tractor and we employ a ball and socket joint 45 for this purpose. This ball and socket joint 45 includes the ball head 46 and the head is secured to one side of the case 23 and it is to be noted that the ball is disposed at right angles to the risers 32 and 33, for a purpose which will also later appear. The ball 46 is adjustably received within the socket portion of the joint 45, and this socket portion preferably includes substantially semi-spherical clamping jaws 47 and 48 held in gripping contact with the ball 46 by an adjustable screw and winged nut 49. Carried by the jaws 47 and 28 are clamping arms 50 and these arms are bent to form gripping jaws which are in turn adjustably secured to the column 15. By referring to Figures 1 and 2, it can be seen that the arms 50 project laterally from the column 15 and transversely of the longitudinal axis of the tractor and the case is so positioned that the risers 32 and 33 are at the front of the case. Hence on tilting of the tractor rearwardly, the mercury will gravitate toward the rear end of the tube and away from the electrodes. If the tractor tilts dangerously toward one side or the other, the mercury will then flow away from one electrode 34 or the other electrode 35, depending upon the direction of tilt and upon the flowing of the mercury away from either electrode the ignition circuit will also be interrupted.

It is essential that the case and the mercury switch tube be initially installed at an exact level position on the tractor and to facilitate this, the cover 25 of the case 23 has embedded therein a spirit level 51.

In installing the case on the tractor, the tractor is driven onto a level floor, after which the case is manipulated on the ball and socket joint 45 until the bubble in the spirit level 51 shows that the case is in an exact horizontal position.

The arrangement and mounting of the case is important, as not only can the case be accurately installed on the tractor in an exact level position, but when the tractor tilts at a dangerous angle and the circuit is broken and the tractor comes to a halt, the operator of the tractor can manipulate the case on the ball and socket joint so as to temporarily restore the ignition circuit to an operative condition so that the tractor can be manipulated and allow the operator to extricate the tractor from its dangerous position.

Various changes in details may be made without departing from the spirit or the scope of this invention, but what we claim as new is:

1. A mercury cutout switch for the ignition systems of automotive vehicles comprising a casing including a bottom wall, a side wall and a removable cap, a resilient pad fitted on the bottom wall, a tube for mercury including a circular body portion fitted on the pad and including a pair of upright risers, electrodes sealed in the risers extending into the body, a clamp plate engaging the body, means detachably uniting the cap with the body and spring means engaging the clamp plate normally urging the same into engagement with the circular body of the tube.

2. A mercury cutout switch for the ignition systems of automotive vehicles as defined in claim 1, and a vertically disposed supporting and location rib formed on the inner surface of the side wall of the casing disposed between the upright risers.

3. A mercury cutout switch for the ignition systems of automotive vehicles as defined in claim 2 and a ball and socket joint carried by the casing and disposed at right angles to the risers and the rib for connecting the casing to the vehicle.

4. A mercury cutout switch for the ignition systems for automotive vehicles comprising a substantially circular tube adapted to normally lie in a horizontal plane, spaced upright risers on the tube forming upright chambers therein, electrodes sealed in the risers and extending into the body, free flowing mercury in the body for bridging electrodes when the body is level, and an upright riser on said body having communication therewith and located opposite said first two mentioned risers providing a chamber for receiving mercury upon the tilting of the body.

References Cited in the file of this patent

UNITED STATES PATENTS

| 1,983,124 | Dodge | Dec. 4, 1934 |
| 2,056,052 | Mason | Sept. 29, 1936 |
| 2,072,362 | Erich | Mar. 2, 1937 |
| 2,124,626 | Mishelevich | July 26, 1938 |

FOREIGN PATENTS

| 214,756 | Switzerland | Aug. 1, 1941 |